United States Patent

Hess et al.

[11] Patent Number: 5,992,385
[45] Date of Patent: Nov. 30, 1999

[54] DEVICE FOR DETERMINING THE IGNITION ADVANCE ANGLE OF AN INTERNAL COMBUSTION ENGINE

[75] Inventors: Werner Hess, Stuttgart; Hong Zhang, Regensburg, both of Germany

[73] Assignee: Robert Bosch GmbH, Stuttgart, Germany

[21] Appl. No.: 08/988,623

[22] Filed: Dec. 10, 1997

[30] Foreign Application Priority Data

Dec. 10, 1996 [DE] Germany ............................ 196 51 238

[51] Int. Cl.$^6$ ....................................................... F02P 5/00
[52] U.S. Cl. .............................. 123/406.23; 123/406.26; 123/406.29
[58] Field of Search ......................... 123/406.29, 406.23, 123/406.26

[56] References Cited

U.S. PATENT DOCUMENTS

| | | | |
|---|---|---|---|
| 4,322,800 | 3/1982 | Hisegawa et al. ................. | 123/406.23 |
| 4,452,205 | 6/1984 | Takasu et al. ..................... | 123/406.23 |
| 4,487,186 | 12/1984 | Wahl et al. ........................ | 123/406.23 |
| 4,541,382 | 9/1985 | Hosoe et al. ...................... | 123/406.29 |
| 4,732,125 | 3/1988 | Takizawa ......................... | 123/406.19 |
| 4,825,832 | 5/1989 | Satoh et al. ....................... | 123/406.29 |
| 5,097,809 | 3/1992 | Sekozawa et al. ................. | 123/406.19 |
| 5,422,811 | 6/1995 | Togai ................................. | 123/406.29 |
| 5,706,784 | 1/1998 | Steinbrenner et al. ............. | 123/406.29 |
| 5,778,857 | 7/1998 | Nakamura et al. ................ | 123/406.29 |

OTHER PUBLICATIONS

Bosch Technical Information, Comined Ignition And Gas Injection System MOTRONIC (1 987 722 011, kh/vdt–Sep. 1985–De).*

*Primary Examiner*—Erick R. Solis
*Attorney, Agent, or Firm*—Kenyon & Kenyon

[57] ABSTRACT

A device for determining the ignition-advance angle of an internal combustion engine, having a device for determining the ignition-advance angle from stored maps on the basis of the recorded parameters of the internal combustion engine, includes a knock control device. The additive ignition-advance angle adjustment defined in the knock control device is able to be added to the ignition-advance map angle to define a base ignition-advance angle. A setpoint torque interface is supplied with the base ignition-advance angle and, at its output, supplies a torque-optimized setpoint ignition-advance angle. The torque-optimized setpoint ignition-advance angle is routed to at least one downstream limiting stage, which limits the setpoint ignition-advance angle to a value that is acceptable for the operation of the internal combustion engine. The output ignition-advance angle is available at the output of the at least one limiting stage for controlling the ignition.

4 Claims, 1 Drawing Sheet

DEVICE FOR DETERMINING THE IGNITION ADVANCE ANGLE OF AN INTERNAL COMBUSTION ENGINE

BACKGROUND INFORMATION

Control units used in electronic ignition control are described in Bosch Technical Information, Combined Ignition and Gas Injection System MOTRONIC (1 987 722 011, KH/VDT-9/85-De). From information pertaining to load and speed, temperature and throttle valve position, the control unit determines controlled variables, such as ignition advance angle and dwell angle, between two ignition processes. In this connection, the controlled variables are defined on the basis of stored (engine characteristics) maps. The map for defining the ignition advance angle is determined by engine bench testing, and is optimized in the vehicle in conformance with specifiable criteria, such as fuel consumption, exhaust, and performance, and is subsequently stored. This facilitates a ready adaptation to every operating state, as well as good vehicle performance, fuel economy, and exhaust gas ratings.

The control unit known from the related art contains a microcomputer, which defines the controlled variables from the operating parameters by extracting the ignition-advance angle from the map. Furthermore, the ignition-advance map angle is able to be adapted to various operating conditions. Thus, the ignition is able to be adjusted to favorable exhaust values, proper dynamic wheel balance, and good fuel economy in idle operation, for example, while vehicle performance and fuel consumption are in the fore in part throttle operation.

In the case of initial load (preload), the emphasis is on achieving maximum torque, while avoiding knocking. The ability to change the ignition-advance angle in conformance with the logic gating of various signals makes it possible for the ignition-advance angle to be individually adapted to every operating state of the engine. Thus, considerable consideration is given to the specific engine requirements, e.g., in the special operating states, start-up, idle operation, overrun (deceleration), and initial load. The ignition-advance angle in question is thus able to be shifted by any desired value as a function of various switch point signals.

SUMMARY OF THE INVENTION

An advantage of the device of the present invention for determining the ignition-advance angle in internal combustion engines is that it ensures an even better adaptation to the requirements of the internal combustion engine by additionally including in the previously disclosed calculation of ignition-advance angles, torque interventions in the ignition-advance angle determined by the control unit. The determination of ignition-advance angles implemented in known methods heretofore and integrated in the control unit can be retained, so that merely by additionally integrating a torque interface is a simple and, thus, cost-effective optimization of the ignition-advance angle determination given.

By adding a limiting stage for the ignition-advance angle that does not permit the ignition-advance angle to be adjusted beyond a base ignition-advance angle, it is assured that the ignition-advance angle of the knock control and, thus, the knock limit is not exceeded. By means of a limiting stage that limits the optimized ignition-advance angle to a permissible maximum, i.e., minimum ignition-advance angle, it is assured that no uncontrolled sudden changes in the ignition-advance angle occur.

DETAILED DESCRIPTION

Figure 1:
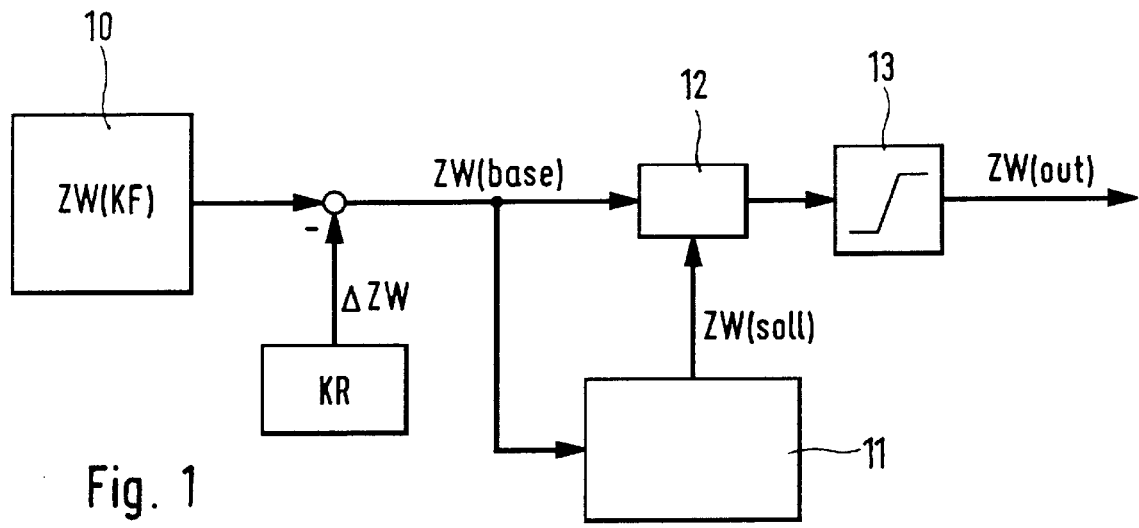
FIG. 1 shows an arrangement for implementing the ignition-advance angle adaptation, with the aid of a torque coordination.

FIG. 1 illustrates an arrangement for determining ignition-advance angle by means of torque coordination by way of the ignition-advance angle path. In this case, in the control unit, in a first processing level 10, the ignition-advance map angle ZW (KF) is defined on the basis of the determined operating parameters of the internal combustion engine, as already elucidated in detail in the related art. Following ignition angle determination ZW(KF), the additive correcting quantity of the ignition-advance angle determined by knock control KR is included in the calculation of ignition-advance map angle ZW (KF). Usually, this base ignition-advance angle ZW(base) then arrives as a controlled variable to be output to the corresponding control unit, e.g., to the output stage in the primary circuit of an ignition coil for switching the ignition coil charging current. These individual functions for determining the base ignition-advance angle are already known from the related art and do not need to be discussed in detail again. This base ignition-advance angle ZW(base) is the input to a setpoint torque interface 11, which supplies the setpoint ignition-advance angle ZW(setpoint) as an output. In setpoint torque interface 11, the base ignition-advance angle is acted upon from the standpoint of the engine's required torque; in this context, one can effect both a retarding of the base ignition-advance angle and, thus, a torque reduction, as well as an advancing of the ignition-advance angle and, thus, an increase in the torque. In the final analysis, the base ignition-advance angle in the setpoint torque interface is adapted very selectively to the concrete requirements of the internal combustion engine.

The output of setpoint torque interface 11 is routed, in the same way as base ignition-advance angle ZW(base) to a limiting stage 12. Limiting stage 12 assures that setpoint ignition-advance angle ZW(setpoint) output by the setpoint torque interface does not exceed the ignition-advance angle value predefined by the knock control, this ignition-advance angle value still assuring a knock-free operation, so that the ignition-advance angle is not adjusted beyond the knock limit. The output of limiting stage 12 is routed to another limiting stage 13. This other limiting stage 13 assures that the ignition-advance angle does not exceed a permissible maximum, i.e., fall short of a minimum ignition-advance angle. In the final analysis, the other limiting stage 13 outputs ZW(out) for driving the ignition output stage. By adding to the conventional determination of ignition-advance angle a setpoint torque interface between the known arrangement for defining the ignition-advance angle and the ignition-advance angle specification, this device has made it simply possible to control the operation of the internal combustion engine in conformance with the prevailing torque requirements.

Figure 2:
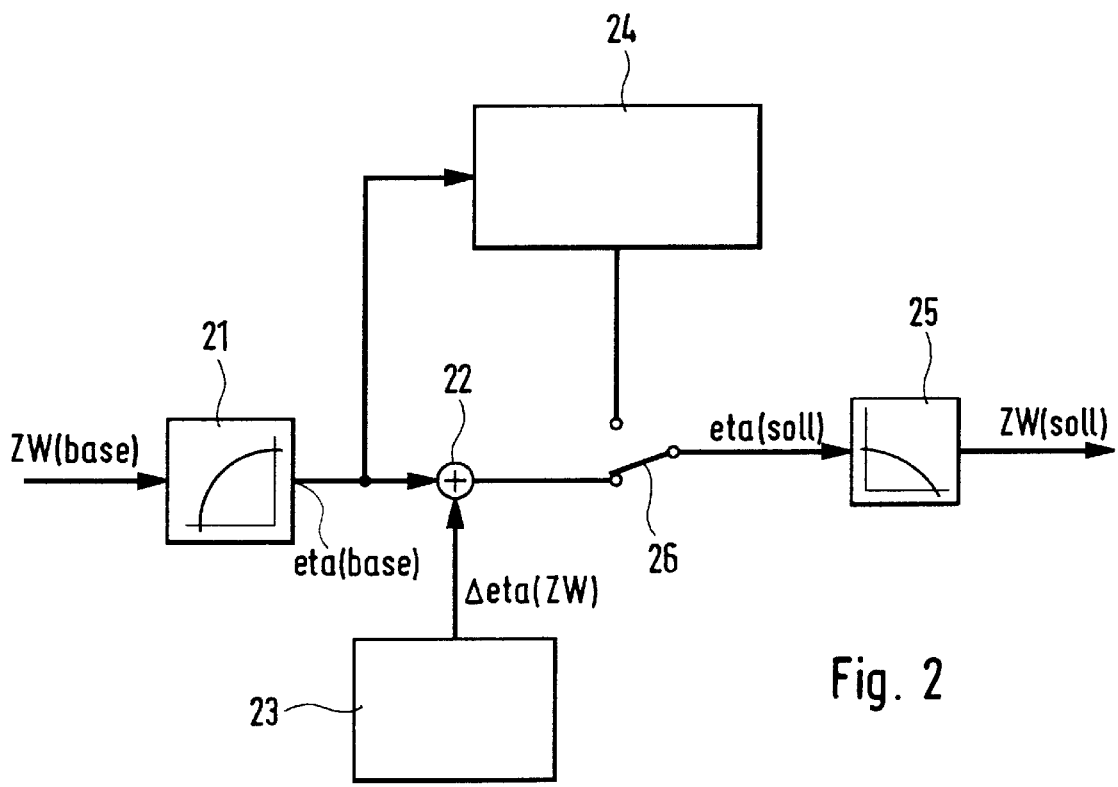
FIG. 2 shows an arrangement for adapting the ignition-advance angle, with the aid of an optimization of ignition-advance angle efficiency.

FIG. 2 depicts another possibility for optimizing the ignition-advance angle. In this example, the ignition-advance angle is not optimized at the torque level, rather the efficiency levels (degrees) of the ignition-advance angle are determined and optimized. Thus, as already sufficiently known from the related art and also described with respect to FIG. 1, base ignition-advance angle ZW(base) is determined. In a first processing stage 21, base ignition-advance angle ZW(base) is converted into its ignition angle efficiency level eta(base). The output of processing stage 21 is routed to its summing point 22, to which is also routed the output of an efficiency-level determining stage 23. This efficiency-level determining stage calculates a value Δeta (ZW), which is applied cumulatively to the efficiency level of the base ignition-advance angle. On the basis of demands placed on the internal combustion engine, this efficiency-level determining stage 23 defines the correcting quantity Δeta(ZW). In this context, for example, functions which are not included in the calculation of base ignition-advance angle ZW(base), but for which it seems useful to consider them for physical reasons, are calculated in the form of correcting quantity Δeta(ZW). Thus, the ignition-angle efficiency level can be properly optimized in efficiency-level determining stage 23, e.g., when working with the anti-judder function.

Subsequently, in a summing stage 22, correcting quantity Δeta(ZW) is applied cumulatively to the base efficiency level. The output of summing stage 22 is applied to a selection stage 26. Alternatively to applying a correcting quantity Δeta(ZW) to the efficiency level eta(base), the efficiency level can also be adapted using other functions, such as by means of a gear intervention.

The base efficiency level eta(base), after being output by processing stage 21, is also routed to an efficiency-level optimization stage 24, e.g., for influencing the gear intervention. The efficiency-level base value eta(base) is optimized and routed as efficiency-level setpoint value eta (setpoint) to selection stage 26. Depending on the predefinable demand made on the operation of the internal combustion engine, either the cumulatively optimized ignition-angle efficiency level or the efficiency level that is optimized as a function of other parameters is output to a transfer stage 25, which transfers efficiency-level setpoint value eta(setpoint) back to a setpoint ignition angle ZW(setpoint). When the proposed devices are used to determine the ignition-advance angle, one can respond very effectively to the current demands being placed on the operation of the internal combustion engine without having to alter the already existing ignition-advance angle function.

What is claimed is:

1. A device for determining an ignition-advance angle of an internal combustion engine, comprising:

a first processing element for determining an ignition-advance angle from stored maps as a function of recorded parameters of the engine;

a knock control for defining an additive ignition-advance angle adjustment to be added to the ignition-advance angle to determine a base ignition-advance angle;

a setpoint torque interface supplied with the base ignition-advance angle, the setpoint torque interface supplying, at an output, a torque-optimized setpoint ignition-advance angle;

at least one downstream limiting stage receiving the torque-optimized setpoint ignition-advance angle and limiting the torque-optimized setpoint ignition-advance angle to a value for operating the engine, the at least one downstream limiting stage providing, at an output, an output ignition-advance angle for controlling an ignition of the engine.

2. The device according to claim 1, wherein the at least one limiting stage includes a first limiting stage limiting the setpoint ignition-advance angle to a no-knock ignition-advance angle defined by the knock control.

3. The device according to claim 2, wherein the at least one limiting stage further includes a second limiting stage limiting the setpoint ignition-advance angle to a maximum permissible change and a minimum permissible change in the ignition-advance angle.

4. The device according to claim 1, wherein the ignition-advance angle is converted into an ignition-advance angle efficiency level, the efficiency level is adapted to conform to required efficiency conditions of the engine, and the adapted efficiency level is subsequently applied to the ignition-advance angle.

* * * * *